Patented May 27, 1947

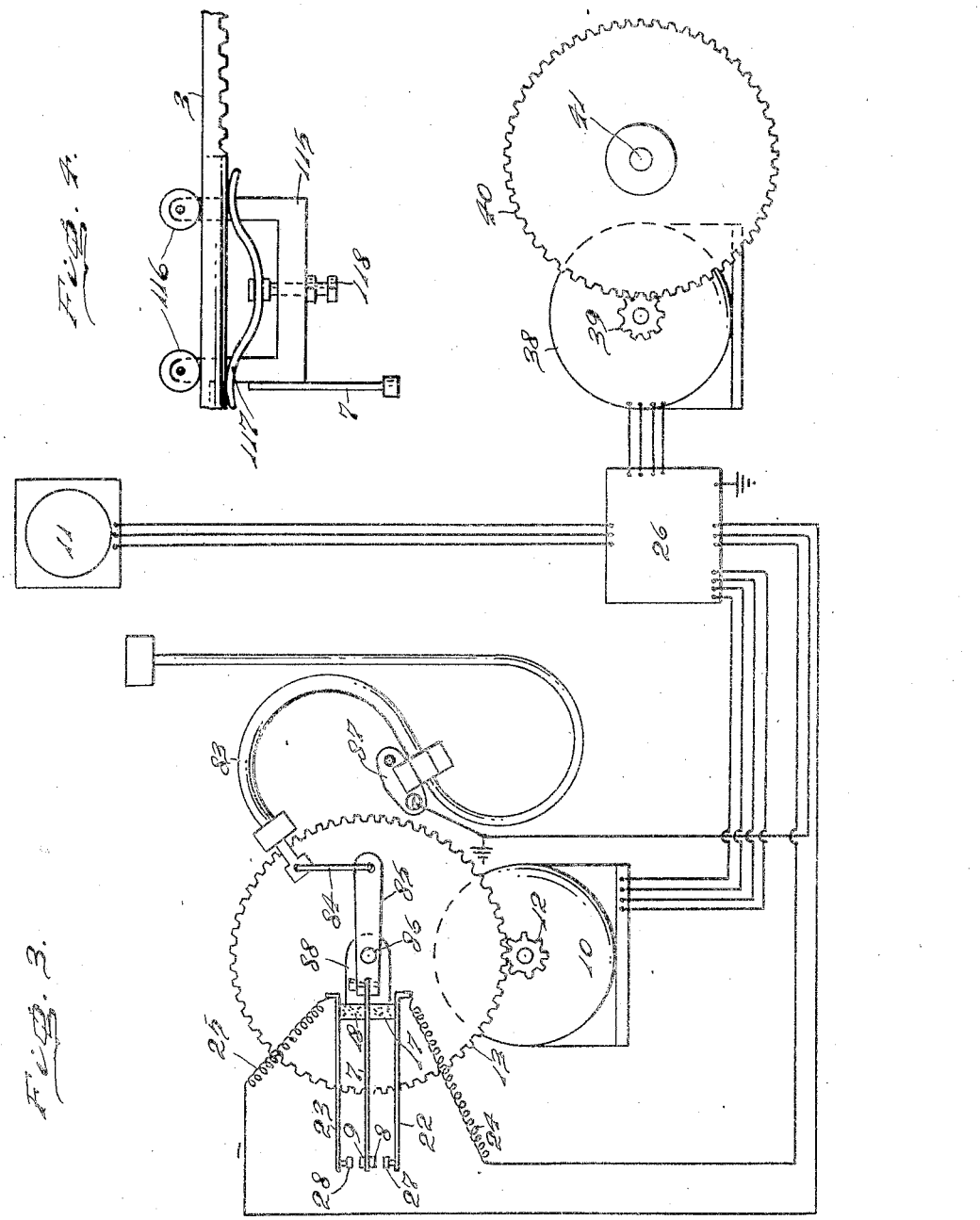

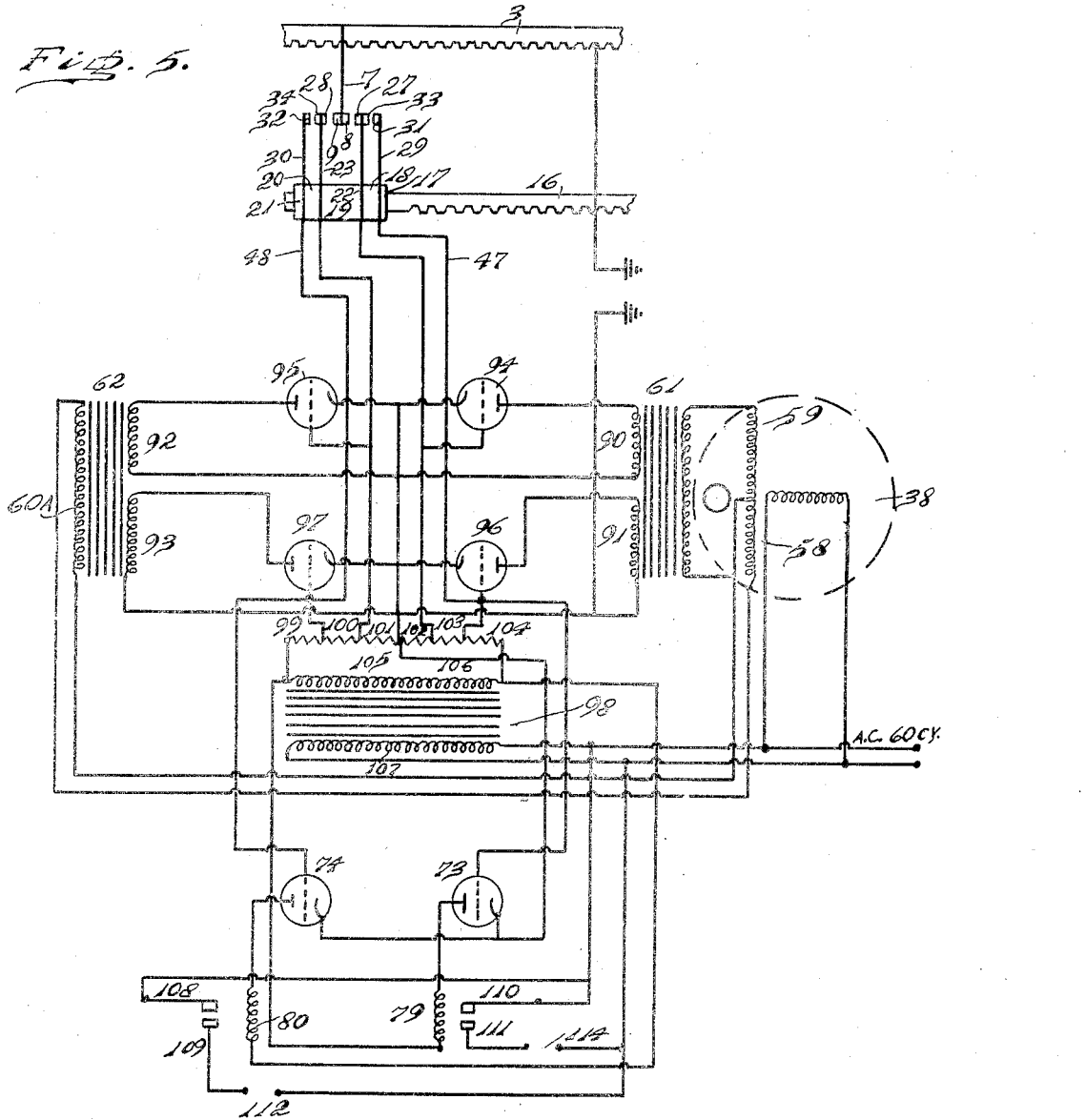

2,421,295

UNITED STATES PATENT OFFICE 2,421,295

APPARATUS FOR APPLYING LOAD TO TESTING MACHINES

Jens Sivertsen, Philadelphia, Pa., assignor to Tinius Olsen Testing Machine Company, Philadelphia, Pa., a corporation of Pennsylvania Application July 10, 1943, Serial No. 494,177

2 Claims. (Cl. 73—90)

1

The present invention relates to the application of load to a specimen in a testing machine, and the automatic control of the application of the load.

Due to the peculiar characteristics of testing machines and of the materials tested, it has been found to be important to have the application of load proceed at an uniform rate from one test or specimen to another, and also to have the application of load uniform during a test.

In order to obtain this, many testing machines are supplied with a timing arrangement which rotates a pointer at a desired, uniform rate of speed. The operator notes this speed and its relative position to the load indicator. By opening or closing the loading valve of the testing machine, manually, the operator can make the load indicating pointer advance at the same speed as the timing pointer.

In modern production testing, not only the maximum strength of the specimen is required, but also the yield strength, elastic elongation, and total elongation. The operator is thus kept very busy, and, if he is supposed to make a certain number of tests per hour, he finds that he does not have enough time to watch the loading rate carefully enough. If he does, he can make fewer tests per hour.

In order to relieve the operator and provide a more uniform load application, the present method has been devised so that the load application will be fully automatic.

One way of doing this, using electrical or electronic means, is to arrange contacts positioned by the sensitive weighing system of the testing machine. Cooperating contacts are mounted on the timing device. These different contacts are made to travel the same path in such a manner that if the load pointer travels at exactly the same speed as the timer, contact will not be esablished, and the loading will proceed undisturbed by any outside force.

If, however, the load pointer travels too slow, contact is established between a load contact and a control contact. This making of a contact, by means of a control box, effects a reversible motor intergeared with a load valve so that the load valve will be opened to a greater degree and more oil will be discharged into the loading cylinder of the testing machine. This speeds up the load indicating system until, after a brief interval, the contact is broken.

If the load indicating pointer travels too fast, relatively to the timer, a contact will be made at the opposite side of the contact mechanism,

2 which will cause the loading valve to turn in the opposite direction, thereby slowing down the rate of the load application until the contacts break. The system as outlined works satisfactorily in some cases, although the loading speed is never actually uniform. It is either too slow or too fast. This is a position control system, but as we are more interested in the speed with which the positions are changing, I prefer the system as hereinafter set forth in detail.

With the foregoing and other objects in view as will hereinafter clearly appear, my invention comprehends a novel method of controlling automatically the rate of load applied to a specimen in a testing machine.

Other novel features of the invention and steps of the method will hereinafter appear in the detailed description and the appended claims.

Figure 3 is a schematic view of a control system using a Bourdon tube and by means of which my novel method can be carried out in practice.

Figure 4 is a side elevation of another embodiment of the invention.

Figure 5 is a wiring diagram.

Similar numerals indicate corresponding parts.

Figure 1:
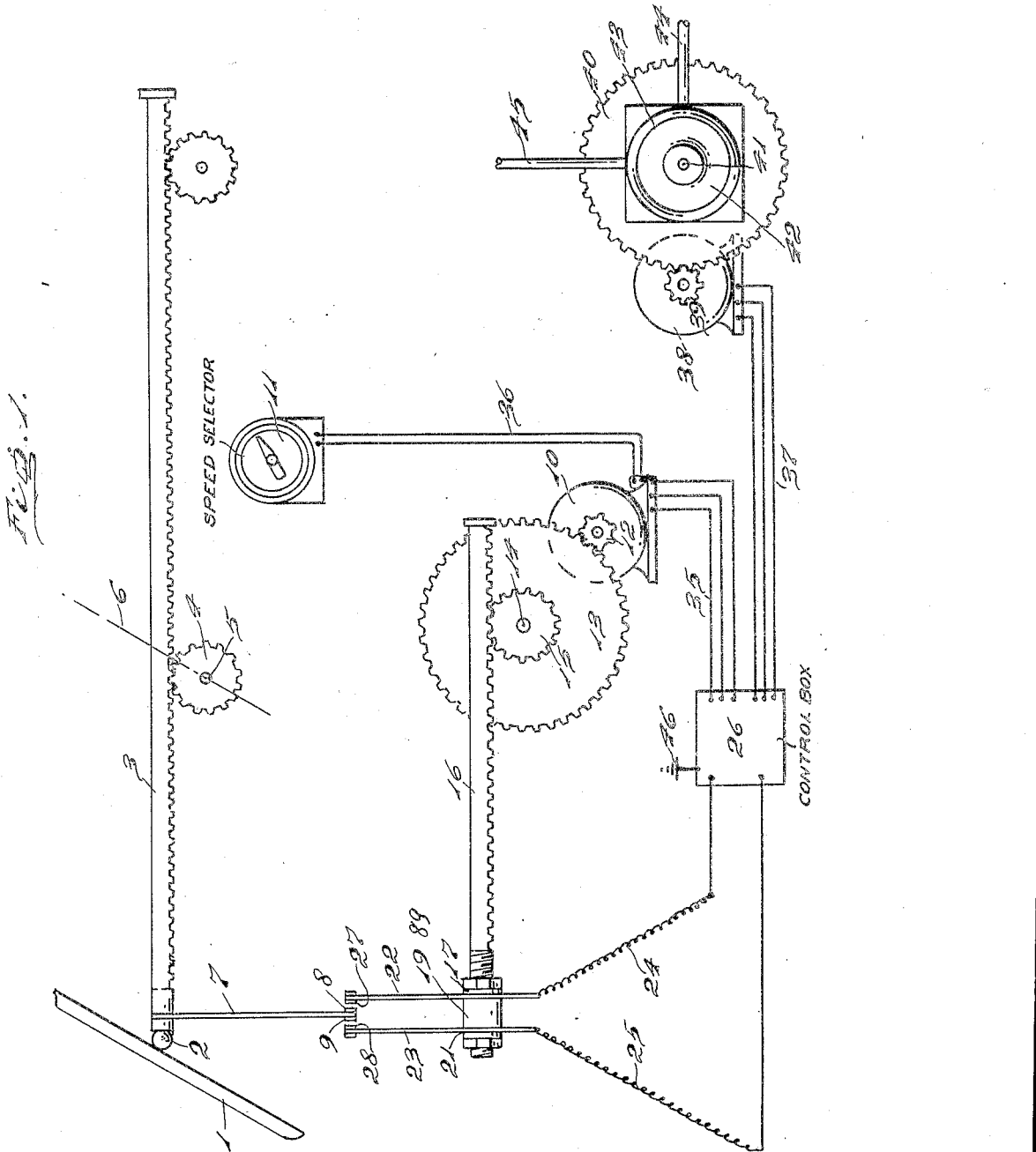
Figure 1 is a schematic view of a control system for carrying out in practice my novel method.

Referring to the drawings:

1 designates an arm which is part of the weighing system of the testing machine, for example, an arm fixed to the pendulum shaft of a pendulum weighing system now well known in this art. The arm 1 presses against a ball 2, at the end of a rack 3, suitably guided, and rotating a pinion 4 and its shaft 5, which latter carries a load indicating pointer 6, visible from the front of the machine. The position of this rack and pointer from their starting positions proportionally indicates the load. A leaf spring 7 is fixed at one end to the rack and carries contacts 8 and 9. A motor 10, with a speed control 11 in the form of a resistor, has on its shaft a gear 12 in mesh with a gear 13 on a shaft 14, which latter carries a pinion 15 in mesh with a rack 16. The rack 16 carries insulators 17, 19 and 21 to mount leaf springs 22 and 23, which, by means of the insulators, are electrically insulated from each other and from the rack. To the springs 22 and 23 are fastened light flexible wires 24 and 25, which are extended to a control box 26. The springs 22 and 23 carry contacts 27 and 28 facing the contacts 8 and 9 on the spring 7. The control box 26 connects with wires in a cable 35 with the motor 10, which by cable 36 is connected with the motor speed selector 11.

The control box 26 is connected by wires 37 with a reversible motor 38, having on its shaft a gear 39, meshing with a gear 40, which by friction is fastened to a shaft 41 of a loading valve 42. This loading valve may have at the front of the testing machine a hand wheel for manual operation, as indicated at 43.

When the motor runs, it will either partially open or partially close the valve 42.

A pipe connection 44 connects to the loading pump, (not shown), of the testing machine, and a pipe connection 45 connects with the loading cylinder (not shown), of the testing machine.

In order to better understand the operation of the control system, the following explanation is made.

The motor 10 normally runs at a constant speed as selected by the speed selector 11, moving the rack 16 by means of the gears 12, 13 and 15 at the desired loading rate. If the loading rate of the testing machine does not correspond, but, for example, is too fast, a contact will be established between contacts 8 and 27. Contact 8 is grounded by means of the rack 3 and thereby to ground connection 46 of the control box 26. The closing of contacts 8 and 27 is arranged to control both the motor 38 and the motor 10. Motor 38 will start running in a direction which will slow down the loading of the testing machine, which was loading too fast. Motor 10 will be affected to abandon its constant speed, thereby running the rack 16 faster, which will break the contact between contacts 8 and 27. When the contact breaks, the motor 10 will slow down, and proceed again at its preselected, constant speed, corresponding to the desired loading rate of the testing machine. Motor 38 stops. During the time it was running, it closed the loading valve to a desired degree, thus slowing down the loading of the testing machine which was loading too fast.

If not enough adjustment of the loading valve was made, contacts 8 and 27 will again in a short time make contact, and further automatic adjustment will be made.

If the testing machine is loading too slow relatively to the desired speed of loading, contact will be made between contacts 9 and 28. This will cause the motor 38 to rotate to open the loading valve, thereby speeding up the loading of the testing machine. The closing of such contacts will momentarily slow down the motor 10, and thereby gears 12, 13 and 15, and rack 16, causing the breaking of contacts 9 and 28. When such contact is broken, the motor 38 stops, and the motor 10 resumes its normal, selected speed.

The fundamental, theoretical difference between the system as first outlined and the present system may not be readily apparent. The main feature, however, will be that whenever a contact is made and the loading valve adjusted, the relative positions between the contacts are reestablished at the zero position. No kinetic or potential energies are contained at this time, which is one of the main characteristics of a swinging or pendulum system.

Additional advantages are also apparent. Under ordinary circumstances, i. e. when the test is proceeding at the right speed, the pacer rack does not touch the sensitive rack of the weighing system of the testing machine. When contact is established, we get a disturbance of the weighing system, but, due to the contact's action on the motor 10, the contact is immediately broken and the weighing rack is free from disturbance.

In Figure 5 additional springs 29 and 30 are shown, with insulated, flexible wires 47 and 48, contacts 31 and 32 and cooperating contacts 33 and 34, associated with the springs 22 and 23 and their adjuncts. The springs 29 and 30 with associated equipment are not an essential part of the system. They are an improvement which may be used to run the motor at an increased speed in the direction desired. They are important in the following instances:

If the wedge gripping type of specimen holders is used, a part of the cross-head motion of the testing machine is not used to stress the specimen but rather used to grip. The valve opening should therefore be much more than after the gripping action takes place. The load may lag behind, which will cause contact not only between contacts 9 and 28 but also contacts 32 and 34, to increase more speedily the valve opening.

When the slip in the gripping period is over, the load may rise rapidly thereby causing contacts between contacts 8 and 27 and contacts 31 and 33, which will serve to close the loading valve fast by speeding up motor 38.

The contacts 32 and 34 may also serve to actuate a signal, for example, to ring a bell or give some audible signal to the operator that the loading rate is far off the prescribed rate. This will signal the operator, when the plastic state of the material has been reached, that a different loading rate is required, and that he may personally take over the control by using the manual control 43.

We have so far assumed that the testing machine was of the hydraulic type where the load is applied to the specimen by means of an hydraulic ram, and the control is by means of a valve on the shaft 41, carrying gear 40 and manual control 43. Other types of loading systems can be used, for example, the mechanical loading type where the load is applied by means of screws and nuts, driven by a variable speed motor controlled by a rheostat, and arranged with its shaft corresponding to the shaft 41.

Figure 2:
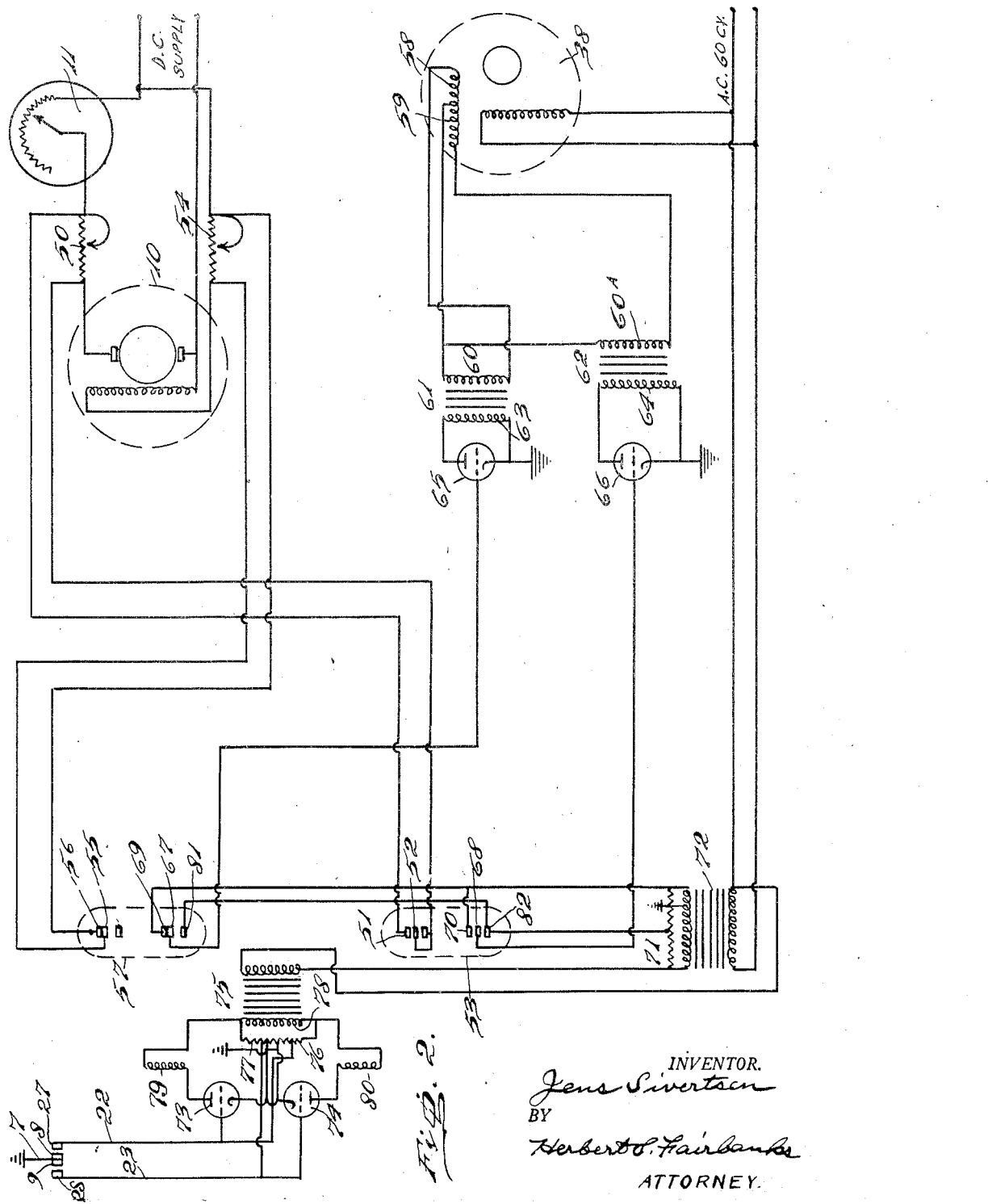
Figure 2 is a wiring diagram.

The control box 26 is shown in detail in Figure 2. It must, however, be understood that this is not the only electrical arrangement that will operate satisfactorily, and I do not desire to be limited to the arrangement shown.

Referring now to the wiring diagram seen in Figure 2, the pacing motor 10 is a D. C. motor driven by a D. C. supply. This may be rectified current or D. C. current from the same A. C. source that supplies the motor 38 with A. C. current. The speed selector 11 has its resistor in series with the armature of the motor 10, whereby the desired speed can be selected. Also in series with the armature is an adjustable resistor 50, shorted by means of a contact 51 and movable contact 52 of a relay 53. The resistor 50 is normally shorted when relay 53 is energized and the contact open. The motor will slow down due to the action of the resistor 50.

In series with the field of the motor 10 is a resistor 54. Wires lead to a central contact 55 and a contact 56 of a relay 57. The resistor 54 is normally shorted, but when relay 57 is energized, the resistor 54 is in series with the field, thereby weakening the field and increasing the speed of the motor 10.

The motor 38 has its main field supplied by A. C., 60 cycle, current. The motor has two other fields 58 and 59 which by wires are connected to primaries 60 and 60A of transformers 61 and 62. The secondaries of said transformers, 63 and 64 respectively, connect across the plate-cathode circuit or path of thermionic tubes 65 and 66. The grids of said tubes are biased out of phase with their plate voltage by means of center contacts 67 and 68, resistor contacts 69 and 70, potentiometer 71 and transformer 72 supplied from some A. C. source such as that of motor 38. The A. C. plate voltages of tubes 65 and 66 are supplied by transformers 61 and 62 from the coils 58 and 59.

The action of motor 38 is such that if coil 58 has a lower impedance across than coil 59, the motor will run in one direction, and if the impedance across coil 59 is lower, then the motor will run in the opposite direction. By changing the grid bias in tubes 65 and 66, we can change the apparent impedance of these tubes, which is reflected into coils 58 and 59.

Tubes 73 and 74 receive A. C. power from their plate-cathode path by means of a transformer 75, and a grid bias of opposite phase from said transformer by means of tapped resistors 76 and 77 across the secondary winding 78 of the transformer.

Relay coils 79 and 80 are in series with the plates of these tubes, respectively.

This electrical system provides a control for the automatic loading of the testing machine. If the testing machine is loading too fast, contact is made between contacts 8 and 27. This removes the bias on the grid of tube 73, which thereby will pass plate current, energizing the coil 79 of the relay 57. Contacts 55 and 67 will move to energized positions. 55 and 56 will thereby open remove the short circuit across resistor 54, decrease the field current of the motor 10 and thereby speed up such motor as required. Contact 67 will leave contact 69 and move to contact 81, thereby giving the grid of tube 65 a voltage which is in phase with the plate voltage, and, thereby, by means of transformer 61, reflect a lower impedance to the coil 58. Motor 38 will revolve to turn valve 42 in a closing direction, thereby slowing down the loading of the testing machine. When contacts 8 and 27 break, the motor 38 will stop and the motor 10 will resume running at normal speed.

If contact is made between 9 and 28, the relay 53 will be energized. Contact 68 will move to engage a contact 82, changing the grid voltage of tube 66, causing motor 38 to run in a direction to open the valve and speed up the loading of the testing machine. Simultaneously, contact 52 will leave contact 51, thereby causing the armature current to pass through resistor 50, slowing down the motor 10 as desired. The amount of slowing down can be preselected to any amount desired, all the way to a standstill, by adjusting the resistor 50.

By adjusting 54, the speeding up of motor 10 can be adjusted to whatever amount desired within the range the motor will stand.

When contact between 8 and 28 is broken, the motor 38 stops and the motor 10 resumes running at its normal speed.

While the system as thus far explained provides for a rapid restoration of equilibrium of the primary electrical means (contacts 8, 9, 27, 28) by means of slowing down or speeding up the motor 10, and thereby the rack 16, this is not the only way the invention can be practiced.

For example, a separate motor can be used, acting together with the motor 10 or gear 13 by differential action, causing the movement of unit 89 consisting of insulators, 17, 18, 19, 20 and 21, springs 22, 23, 29 and 30 with their contacts, and rack 16.

This separate motor may be the motor 38, which in such case will open the loading valve, thereby speeding up the loading, and in addition will be used to slow down the movement of the rack 16.

In Figure 3 I have shown a system similar in outline to that shown in Figures 1 and 2, but arranged for a testing machine using a Bourdon tube for indicating the load.

A Bourdon tube 83 is fixedly mounted by its socket 87. A link 84 actuates a lever 85 to rotate it around a fixed point such as the shaft 86 as a center when load is applied to the tube 83. The lever 85 carries the leaf spring 7 and contacts 8 and 9. The contacts 8 and 9 are grounded by means of spring 7 and lever 85 to the frame of the machine. A bracket 88 carried by gear 13 and rotatable on shaft 86 has insulators 17 and 18 which insulate leaf springs 22 and 23 and their contacts 27 and 28. Wires 24 and 25 connect the springs with the control box 26. The gear 13 meshes with the gear 12 on the shaft of the timing motor 10 having the speed selector 11 as explained in connection with Figures 1 and 2. The loading motor 38 is intergeared with the shaft 41 of the loading valve 42.

The operation is as explained in connection with Figures 1 and 2. The only difference is that instead of the linear movement of racks 3 and 16, we now have a rotary movement of corresponding elements. The angular movement of the lever 85 can be regarded as substantially proportional to the load on the specimen within the limits of the accuracy required.

In Figure 5, I have shown a wiring diagram whereby the speed of the motor 38 can be varied by means of an extra set of contacts. The motor 38 runs by changing the impedance in the secondary windings 58 and 59 of motor 38 by means of the transformers 61 and 62 and the tubes as explained for Figures 1 and 2, by changing the apparent induction of the circuit connected in series with the secondary coils 58 and 59. The transformer 61 has two secondary windings 90 and 91, and 62 has windings 92 and 93. A tube 94 has its plate-cathode path connected in series with the winding 90 and, similarly, a tube 95 is connected with winding 92, a tube 96 with winding 91, and a tube 97 with winding 93. The tubes are given an A. C. bias of the opposite phase to the plate voltage. This bias is provided by a transformer 98 by means of resistors 99, 100, 101, 102, 103, 104 and secondary windings 105 and 106. The primary 107 of transformer 98 is supplied by the same A. C. source as motor 38.

By means of contacts 8 and 27, resistor 102 is shorted, whereby 94 by means of 90 rotates motor 38. If connection is made to 31, resistor 103 is shorted, rotating 38 faster.

The tubes 95 and 97 will similarly rotate motor 38 in the opposite direction, fast or slow. The tubes 73 and 74 and the relay coils 79 and 80, together with the necessary contacts and adjustments can be used to speed up or slow down the motor 10, and, in addition, with contacts 108 and 109 or 110 and 111, provide a signal that the loading is proceeding too fast or too slow, which sometimes is desirable. This signal may be a bell, speaker or lights and would be connected in the circuit at 112 and 114.

The basic principle which makes this system work smoothly is the fact that the motor 10 is speeded up or slowed down to always retain the spring 7 in substantially zero position. I have shown an electrical system which includes resistors 50 and 54 and associated contacts, and relays 53 and 57 to accomplish this purpose.

Substantially the same purpose can be accomplished mechanically as shown in Figure 4. The leaf spring 7 in this embodiment is not rigidly attached to the rack 2, but is mounted on a carriage 115, having rollers 116 engaging the rack, and having a spring 117. By means of a screw 118, the pressure of the spring 117 is adjusted and thereby the friction between the carriage and the rack. The adjustment is such that springs 22 and 23 can move the spring 7 and the carriage, and the electrical zero is thereby always substantially retained.

I have disclosed herein two systems, the first of which controls the automatic loading by a timer, and the second of which is an improved system. The theoretical difference between the two systems may be stated as follows:

The first system is a natural follow-up system which will try to make the full correction to cause the electrical system to return to its natural zero position.

The second system works on the principle of not making the full necessary adjustment to the loading system, due to the fact that the electrical system will be restored to substantially equilibrium or to momentary zero before this happens. It will then make a new zero adjustment due to the fact that the new zero position is not a true zero, but in this way the loading speed will automatically be adjusted to the right value without overrunning. In the first system due to the action of the hydraulic and weighing systems over-regulation will result.

The outlined systems have contacts as the primary electrical means.

Having thus described my invention, what I claim as new and desire to secure by Letters Patent is:

1. A system to control the loading rate of a specimen, comprising means to establish a loading rate, means to establish a timing rate, means responsive to a difference in said rates to automatically make a permanent adjustment in the loading rate, and means to automatically make a temporary adjustment in the timing rate which is effective only as long as the loading rate is being adjusted.

2. A system to control the rate of loading of a specimen, comprising means to establish a timing rate, and an electrical system controlling the loading rate and comprising a resiliently mounted, single contact moved in accordance with the loading rate, a pair of resiliently mounted contacts, insulated from each other, positioned on opposite sides of said single contact and movable as a unit, in accordance with the loading rate, in the same direction as that of said single contact, whereby one or the other of said pair of contacts is engaged by said single contact in response to a difference in the timing and loading rates, and means to vary the rate of loading in response to the closing of said contacts, said single contact on engagement with the one of said pair of contacts in advance of it causing a decrease in the loading rate, and on engagement with the other of said pair of contacts causing an increase in the loading rate.

JENS SIVERTSEN.

REFERENCES CITED

The following references are of record in the file of this patent:

UNITED STATES PATENTS

| Number | Name | Date |
| --- | --- | --- |
| 1,766,579 | Woodson, Jr. | June 24, 1930 |
| 2,030,457 | Lewis | Feb. 11, 1936 |
| 2,081,599 | Peters | May 25, 1937 |
| 2,091,535 | Templin et al. | Aug. 31, 1937 |
| 2,120,381 | Troxell | June 14, 1938 |
| 2,164,993 | Lewis | July 4, 1939 |
| 2,167,332 | Emery | July 25, 1939 |
| 2,191,282 | Lewis | Feb. 20, 1940 |
| 2,212,085 | Tate | Aug. 20, 1940 |
| 2,317,093 | Blanks | Apr. 20, 1943 |